United States Patent [19]

Christie

[11] 4,096,574
[45] Jun. 20, 1978

[54] FRACTIONATION CONTROL

[75] Inventor: David A. Christie, Bartlesville, Okla.

[73] Assignee: Phillips Petroleum Company, Bartlesville, Okla.

[21] Appl. No.: 819,926

[22] Filed: Jul. 28, 1977

[51] Int. Cl.$^2$ .......................... B01D 3/42; G06G 7/58
[52] U.S. Cl. .................................... 364/501; 202/160; 203/2
[58] Field of Search ............... 364/501, 500, 502, 496; 202/160; 203/1-3, DIG. 18; 208/308, 347, DIG. 1

[56] References Cited

U.S. PATENT DOCUMENTS

| | | | |
|---|---|---|---|
| 3,158,557 | 11/1964 | Tolin | 202/160 |
| 3,165,454 | 1/1965 | Wienecke | 202/160 |
| 3,392,088 | 7/1968 | Johnson | 203/1 |
| 3,428,528 | 2/1969 | Oglesby, Jr. et al. | 364/501 X |
| 3,502,852 | 3/1970 | Lewis | 235/151.12 |
| 3,600,282 | 8/1971 | Lupfer et al. | 364/501 X |
| 3,911,259 | 10/1975 | Huddleston et al. | 364/501 |

OTHER PUBLICATIONS

Lupfer et al–"Computer Control of Distillation Reflux-"–ISA Journal, pp. 34–39, Jun. 1959.

Primary Examiner—Joseph F. Ruggiero

[57] ABSTRACT

Control of a fractionation column is accomplished by manipulating the flow rate of the external reflux in response to a calculation of the internal reflux flow rate to maintain the actual flow rate of the internal reflux at a substantially constant, desired value. An improved method for calculating the internal reflux flow rate when the heats of vaporization of the external and internal reflux are different utilizes a constant, representative of the heat of vaporization of the external reflux divided by the heat of vaporization of the internal reflux, to obtain an accurate calculation of the internal reflux flow rate. Greater accuracy in the calculation yields improved control of the fractionation column. Alternatively, the constant, representative of the heat of vaporization of the external reflux divided by the heat of vaporization of the internal reflux, may be utilized to calculate the required flow rate of the external reflux necessary to maintain some desired internal reflux flow rate. Again, use of the described constant provides greater accuracy in the calculation and yields improved control of the fractionation column.

24 Claims, 4 Drawing Figures

FRACTIONATION CONTROL

This invention relates to control of a fractionation column. In one aspect it relates to the computation of the internal reflux flow rate in a fractionation column where the heats of vaporization of the external and internal reflux streams are not the same. In another aspect it relates to the control of a fractionation column in response to the computation of the internal reflux flow rate in that column. In yet another aspect it relates to the computation of the flow rate of external reflux into a fractionation column, required to maintain some desired internal reflux flow rate in the fractionation column, where the heats of vaporization of the external and internal reflux streams are not the same. In still another aspect it relates to the control of a fractionation column in response of the computation of the external reflux flow rate necessary to maintain some desired internal reflux flow rate.

It is known that small changes in the temperature of the reflux returning to a continuous fractional distillation column can induce disturbances to the extent that the major instruments used for automatic control of the unit must be detuned to preserve stability. Many fractionators, which are inherently not self regulating, tend to operate in an oscillatory manner unless the reflux temperature is closely controlled.

The immediate effect caused by a change in reflux temperature is to cause a change in the internal reflux flow rate. Internal reflux is the combination of the external reflux returned to the fractionation column and the vapor at the top of the column that is condensed by temperature equilibration when the cooler external reflux enters the somewhat warmer fractionation column at or near the top thereof. The internal reflux flows towards the bottom of the fractionator column where it is reheated, this expenditure of energy producing multi-stage distillation from which distillate and bottoms products or relatively high concentration of desired components may be produced.

It is well known that control of fractionation columns can be improved by computing and regulating the internal reflux flow rate in the column and thus accommodating the effect of imperfect regulation of the reflux temperature. The known equation for computing the internal reflux flow rate $R_i$ is $$R_i = R(1 + K \Delta T) \quad (I)$$

where $R$ is the flow rate of the external reflux returning to the fractionation column, $\Delta T$ is the difference between the temperatures of the vapor from the refluxed tray and the external reflux returning to the column, and $K$ is equal to the specific heat of the external reflux divided by the heat of vaporization of the external reflux. This equation is developed in Computer Control of Distillation Reflux, ISA Journal, June, 1959, P34–39 by D. E. Lupfer and D. E. Berger. This article also shows apparatus which can be employed to solve the internal reflux flow rate equation and control a simple fractionation column in response to the calculation.

Lupfer and Berger note that the calculation of the internal reflux flow rate by equation (I) is only an approximation because it was assumed that the heat of vaporization of the external reflux is equal to the heat of vaporization of the internal reflux. In many fractionation systems this assumption is valid and solution of the equation developed by Lupfer and Berger provides efficient control of a fractionation column. However, because of physical peculiarities in some distillation processes, the above assumption will not always be valid. Examples of this are processes where only a portion of the overhead vapors are condensed to produce reflux or the reflux contains foreign material from outside the column. When this occurs, the heat of vaporization of the external and the internal reflux will not be the same and equation (I) will not provide the desired accuracy in calculating the internal reflux flow rate.

Accordingly, it is an object of this invention to provide a control system for a fractionation column. Another object of this invention is to provide a system for calculating the internal reflux flow rate in a fractionation column where the heats of vaporization of the external and internal reflux streams ae not the same. Yet another object of this invention is to provide a method and apparatus for controlling a fractionation column in response to the computation of the internal reflux flow rate in that column. Still another object of this invention is to provide a system for calculating the flow rate of external reflux into a fractionation column, required to maintain some desired internal reflux flow rate in the fractionation column, where the heats of vaporization of the external and internal reflux streams are not the same. Still another object of this invention is to provide a method and apparatus for controlling a fractionation column in response to the computation of the external reflux flow rate necessary to maintain some desired internal reflux flow rate.

In accordance with the present invention, two alternative methods and apparatus are provided for controlling the operation of a fractionation column. In one embodiment of the invention, a method and apparatus is provided for computing the internal reflux flow rate in a fractionation column where the heat of vaporization of the internal reflux stream is not the same as the heat of vaporization of the external reflux stream. This computation is made from measurements of the rate of flow of external reflux, the temperature of the overhead (refluxed tray) vapors, and the temperature of the external reflux returned to the column. The specific heat of the external reflux, the heat of vaporization of the external reflux, and the heat of vaporization of the internal reflux are all derived from an analysis of the process. Signals representative of these values are combined so as to provide a computed value of the internal reflux flow rate in the fractionation column. The equation used in this calculation is $$R_i = R \left( \frac{H_R}{H_{Ri}} \right) \cdot (1 + K \Delta T) \quad (II)$$

where $H_R$ is the heat vaporization of the external reflux, $H_{Ri}$ is the heat of vaporization of the internal reflux, and $R_i$, $R$, $K$ and $\Delta T$ are as previously defined for equation (I). A signal representative of the calculated internal reflux flow rate can then be employed to control the operation of the fractionation column.

In the second embodiment of the invention, a method and apparatus is provided for computing the flow rate of the external reflux into a fractionation column, required to maintain some desired internal reflux flow rate in the fractionation column, where the heats of vaporization of the external and internal reflux streams are not the same. This computation is made from measurements of the temperature of the overhead (refluxed tray) vapors and the temperature of the external reflux returned to the column. A set point representative of the desired internal reflux flow rate, derived from an engineering analysis of the process, is also utilized. The computation again uses the specific heat of the external reflux, the heat of vaporization of the external reflux, and the heat of vaporization of the internal reflux which are all derived from an analysis of the process. Signals representative of these values are combined so as to provide a computed value of the required external reflux flow rate to the fractionation column. The equation used in this calculation is $$R_C = \frac{R_{id}}{\left(\frac{H_R}{H_{Ri}}\right) \cdot (1 + K \Delta T)} \quad \text{(III)}$$

where $R_c$ is the computed value of the required external reflux flow rate, $R_{id}$ is a set point representative of the desired internal reflux flow rate, $K$ and $\Delta T$ are as previously defined for equation (I) and $H_R$ and $H_{Ri}$ are as previously defined for equation (II). A signal representative of the required external reflux flow rate can then be employed to control the operation of the fractionation column.

Other objects and advantages of the invention will be apparent from the description of the invention and the appended claims thereto as well as from the detailed description of the drawings in which:

Figure 1:
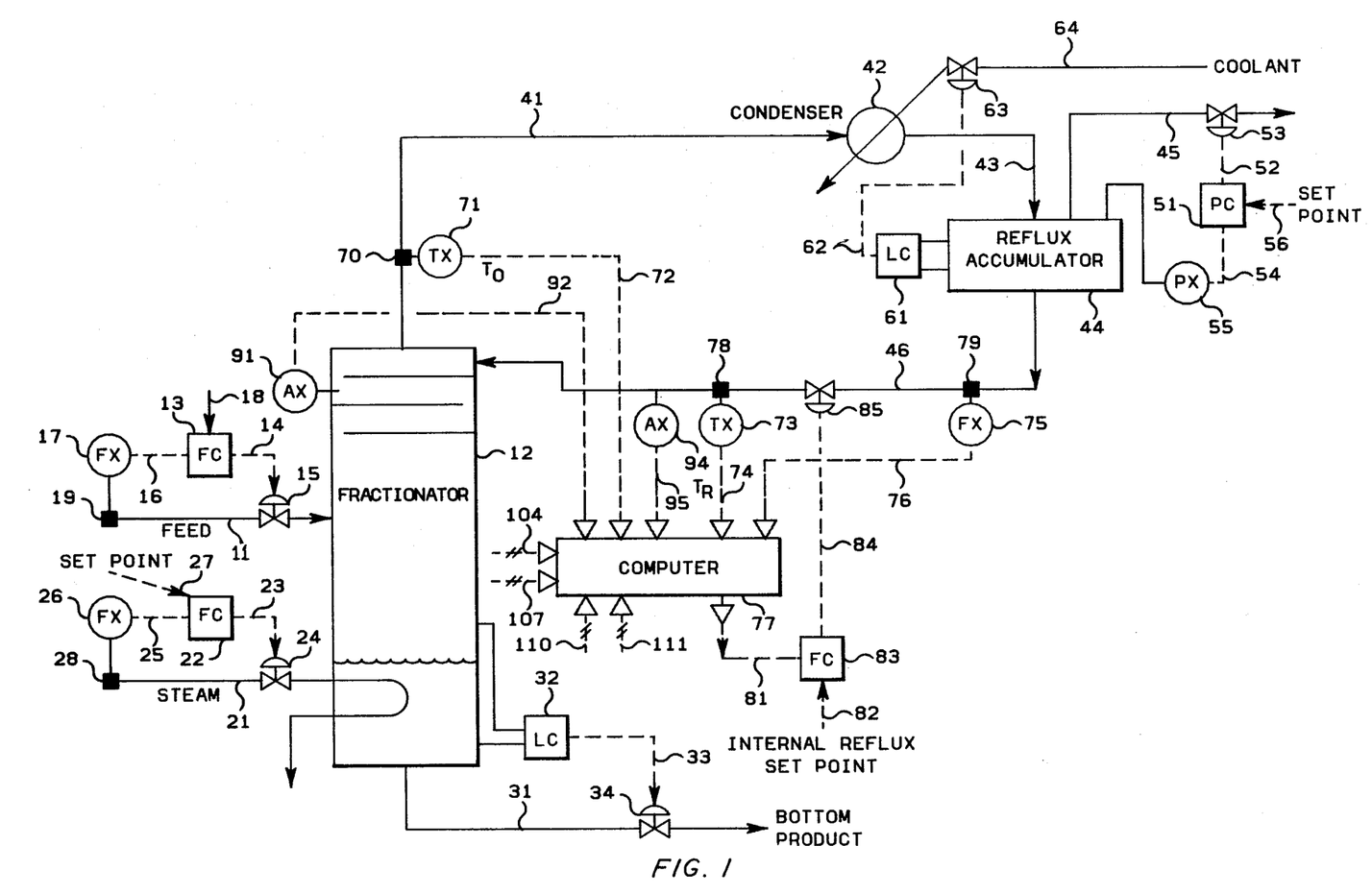
FIG. 1 is a representation of a fractionation column and its associated apparatus together with an associated means of controlling the fractionation process.

Referring now to FIG. 1, a feed mixture to be processed is fed through conduit means 11 to a conventional fractionation column 12. The flow of the feed mixture is controlled at a predetermined rate by a flow controller 13 which manipulates pneumatic control valve 15 via control signal 14. Control signal 14 is produced in response to a comparison by flow controller 13 of the actual flow rate (measurement signal 16), provided by flow transducer 17 in association with flow sensing device 19 located in conduit means 11 and the set point signal 18 representative of the desired flow rate. Steam is supplied to the reboiler of the fractionation column 12 through steam conduit means 21. The flow rate of the stream is controlled at a predetermined rate by flow controller 22 which manipulates pneumatic control valve 24 via control signal 23. Control signal 23 is produced in response to a comparison by flow controller 22 of the actual flow rate (measurement signal 25), provided by flow transducer 26 in association with flow sensing device 28 located in conduit means 21, and the set point signal 27 representative of the desired flow rate.

A bottom product stream is withdrawn from a lower portion of fractionation column 12 through a bottom product conduit means 31. The flow rate of the bottom product from the fractionation column 12 is regulated by level controller 32 which adjusts pneumatic control valve 34 via control signal 33 so as to maintain a predetermined liquid level in the bottom of the fractionation column 12.

Vapors are withdrawn from the top of column 12 through vapor conduit means 41 and are fed to condenser 42. A portion of the vapors are condensed by means of a suitable coolant flowing through coolant conduit means 64. Not all of the vapors are condensed. Both the condensate and the uncondensed vapors are passed to reflux accumulator 44 via conduit means 43. The vapors which are not condensed are phase-separated in and withdrawn from reflux accumulator 44. Control signal 52 is produced in response to a comparison by pressure controller 51 of the actual pressure (measurement signal 54), provided by pressure sensor-transducer 55 located on the reflux accumulator 44 and the set point signal 56 representative of the desired pressure. As shown, all of the condensed vapors in reflux accumulator 44 are returned to the top of fractionation column 12 through reflux conduit means 46 to provide reflux to the column 12. If desired, a portion of this condensate may be removed as liquid overhead product. A level controller 61 regulates pneumatic control valve 63 in the condenser's coolant supply conduit 64 via control signal 62 so as to maintain a predetermined liquid level in the accumulator. This assures that sufficient vapors are condensed to provide the required reflux (and liquid overhead product, if desired) for the column's desired operation.

Temperature sensor 70 measures the temperature of the overhead vapor (in conduit 41 or top of column 12 above the point of introduction of the external reflux). Temperature transducer 71 transmits this information to the computer means 77 via a signal 72 which is representative of the overhead vapor temperature $T_0$. Temperature sensor 78 measures the temperature of the external reflux stream (conduit 46). Temperature transducer 73 transmits this information to the computer means 77 via a signal 74 which is representative of the external reflux temperature $T_R$. Flow sensor 79 measures the flow rate of the external reflux. Flow transducer 75 transmits this information to the computer means 77 via a signal 76 which is representative of the flow rate R of the external reflux.

Analyzer transducer 91 measures the concentration of the various components which make up the internal reflux liquid stream. This information is transmitted to the computer means 77 via a signal 92 which is representative of the concentration of the various components which make up the internal reflux. Signal 92 is represented as a single signal for the sake of simplicity. In actuality signal 92 will be made up of as many signals as there are different components of significant concentration in the internal reflux. Each signal will be representative of the concentration of a particular component in the internal reflux.

Analyzer transducer 94 measures the concentration of the various components which make up the external reflux. This information is transmitted to the computer means 77 via a signal 95 which is representative of the concentration of the various components which make up the external reflux. Signal 95 is represented as a single signal for the sake of simplicity. Signal 95 will in actuality be made up of as many signals as there are different components in the external reflux. Each signal will be representative of the concentration of a particular component in the external reflux. It should be noted that some of the gases in the overhead vapor may not be condensed at all and will thus not be present as liquids in the external reflux. Also the concentration of a particular constituent in the overhead vapor may not be the same as the concentration of the same constituent in the external reflux. Either of these conditions will cause the heat of vaporization of the internal reflux to be different from the heat of vaporization of the external reflux.

The computer 77 is also provided with signal 104, representative of the specific heat of each analyzed component making up the external reflux, signal 110 representative of the heat of vaporization of each analyzed component which makes up the internal reflux, signal 111 representative of the heat of vaporization of each analyzed component which makes up the external reflux, and signal 107 representative of the constant value of +1. Signals 104, 110, and 111 are represented as single signals for the sake of simplicity. Signals 104, 110, and 111 will in actuality be made up of as many signals as there are constituents of significant concentration in either the internal reflux or external reflux, respectively.

Calculation of the specific heat and heat of vaporization of a mixture of compounds or elements is well known in the art. Reference materials such as the *Chemical Engineers Hand book*, 4th and 5th Edition, McGraw-Hill, provide calculations and tables for the specific heat and heat of vaporization of many compounds and elements. A signal generator or other suitable means may be used to establish signals 104, 110, and 111 in response to the calculation of the specific heat and heat of vaporization of the constituents of the external and internal reflux.

The computer means 77 calculates the specific heat of the external reflux based on the analysis of the concentration and the specific heat of each constituent of significant concentration in the external reflux. The heat of vaporization of the external reflux $H_R$ is calculated based on the analysis of the concentration and the heat of vaporization of each constituent of significant concentration in the external reflux. The heat of vaporization of the internal reflux $H_{Ri}$ is calculated based on the analysis of the concentration and the heat of vaporization of each constituent of significant concentration in the internal reflux.

The computer means 77 then calculates the internal reflux flow rate using equation (II). A signal 81, representative of the calculated value of the internal reflux flow rate, is output by the computer means 77 to a flow controller 83. Flow controller 83 is also provided with a signal 82 representative of the desired internal reflux flow rate (set point). The flow controller 83 compares the actual and desired internal reflux flow rates and generates a control signal 84 by which a pneumatic control valve 85 is manipulated in such a manner as to maintain stable operational control of the fractionator column 12.

Figure 2:
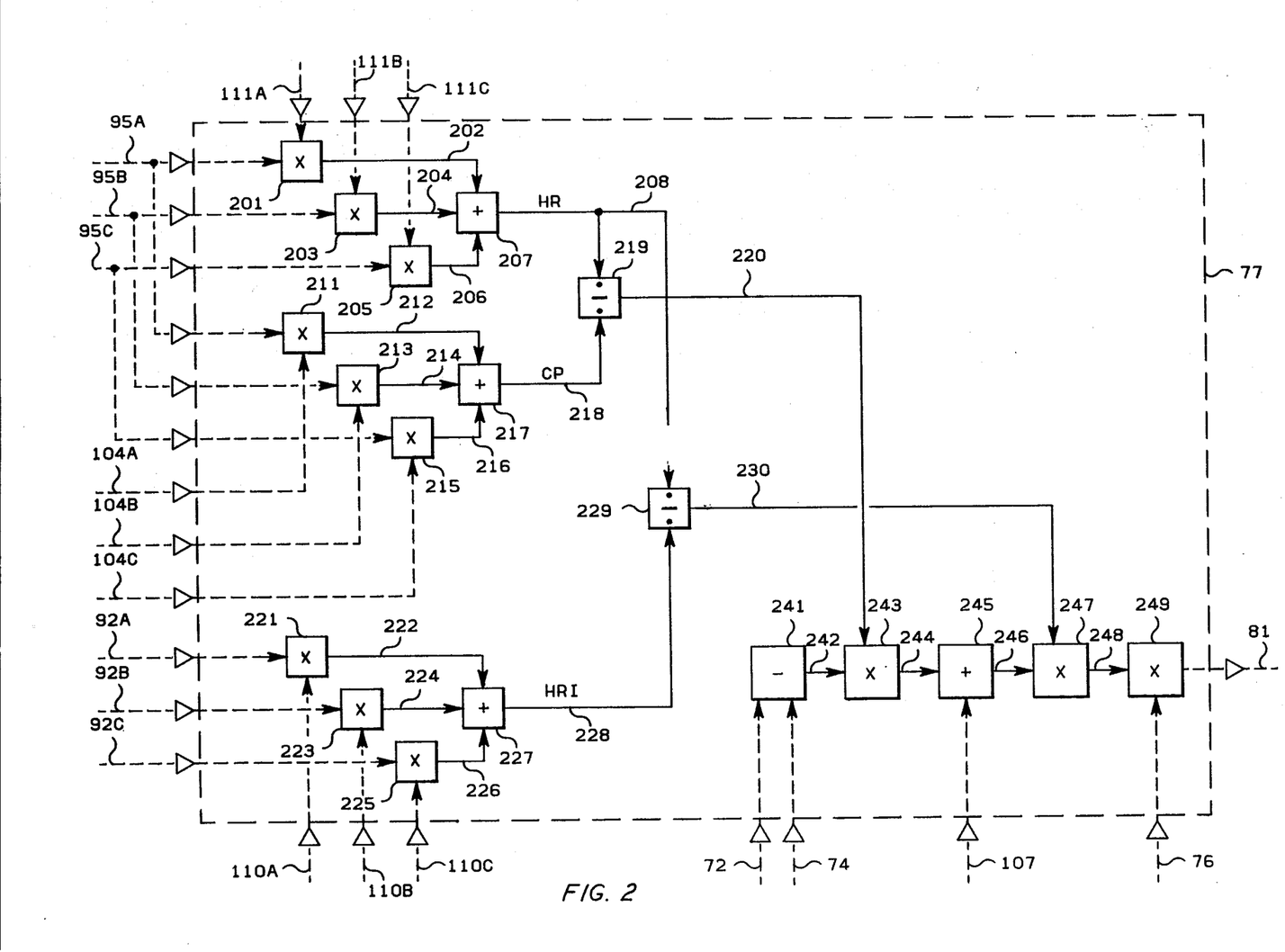
FIG. 2 is a representation of computer logic suitable for the calculation of the internal reflux flow rate in accordance with the preferred embodiment of the present invention as illustrated in FIG. 1.

A number of electronic and/or pneumatic systems can be used to automatically calculate the internal reflux flow rate using equation (II). The basic computer logic is shown in FIG. 2. For the sake of illustration is has been assumed that both the internal reflux and the external reflux are made up of three constituents. It is also assumed that the concentration of the constituents in the internal reflux is different from that in the external reflux due to some peculiar aspect of the distillation process. Thus measurement signals 92 and 95 and derived signals 104, 110, and 111 of FIG. 1 will each be three separate signals rather than the one signal shown in FIG. 1. The three separate signals are designated "a", "b", and "c" in FIG. 2. All signals labeled "a" are either measured or derived values of the same constituent and likewise for signals labeled "b" and "c".

Referring to FIG. 2, signal 95a, representative of the concentration of a first constituent of the external reflux, is multiplied by signal 111a, representative of the heat of vaporization of the first constituent of the external reflux, by multiplying means 201 to produce signal 202, representative of the heat of vaporization contributed to the external reflux by the first constituent. Likewise signals 95b and 111b are multiplied by multiplying means 203 to produce signal 204 representative of the heat of vaporization contributed to the external reflux by the second constituent. Similarly, signals 95c and 111c are multiplied by multiplying means 205 to produce signal 206 representative of the heat of vaporization contributed to the external reflux by the third constituent. Signals 202, 204, and 206 are summed by summing means 207 to produce signal 208, representative of the total heat of vaporization of the external reflux.

Signal 95a is also multiplied by signal 104a, representative of the specific heat of a first constituent of the external reflux, by multiplying means 211 to produce signal 212, representative of the specific heat contributed to the external reflux by the first constituent. Likewise, signals 95b and 104b are multiplied by multiplying means 213 to produce signal 214, representative of the specific heat contributed to the external reflux by the second constituent. Similarly, signals 95c and 104c are multiplied by multiplying means 215 to produce signal 216, representative of the specific heat contributed to the external reflux by the third constituent. Signals 212, 214, and 216 are summed by summing means 217 to produce signal 218, representative of the total specific heat of the external reflux.

Signal 92a, representative of the concentration of a first constituent of the internal reflux, is multiplied by signal 110a, representative of the heat of vaporization of the first constituent of the internal reflux, by multiplying means 221 to produce signal 222, representative of the heat of vaporization contributed to the internal reflux by the first constituent. Likewise signals 92b and 110b are multiplied by multiplying means 223 to produce signal 224, representative of the heat of vaporization contributed to the internal reflux by the second constituent. Similarly, signals 92c and 110c are multiplied by multiplying means 225 to produce signal 226, representative of the heat of vaporization contributed to the internal reflux by the third constituent. Signals 222, 224, and 226 are summed by summing means 227 to produce signal 228, representative of the total heat of vaporization of the internal reflux.

Signal 218 is divided by signal 208 by dividing means 219 to produce signal 220 which is representative of the constant K utilized in equation (II). Signal 208 is divided by signal 228 by dividing means 229 to produce signal 230 which is representative of the constant $H_R/H_{Ri}$ utilized in equation (II).

Signal 74, representative of the temperature of the external reflux, is subtracted from signal 72, representative of the temperature of the overhead vapor, by a subtracting means 241 to produce a signal 242 representative of the difference, $\Delta T$, in the two temperatures. The difference signal 242 and a signal 220, representative of the value of the specific heat of the external reflux divided by the heat of vaporization of the external reflux K, are multiplied by a multiplier means 243 to produce signal 244, representative of the value $K\Delta T$. A summing means 245 adds a signal 107, equal to +1, to signal 244 to produce signal 246 representative of the value $(1 + K \Delta T)$. Signal 246, and signal 230, representative of the derived value of the heat of vaporization of the external reflux divided by the derived value of the heat of vaporization of the internal reflux, $H_R/H_{Ri}$, are multiplied by a multiplier means 247 to produce a signal 248, representative of the value $$(H_R/H_{Ri}) (1 + K \Delta T).$$

The signal 248 and signal 76, representative of the actual flow rate of the external reflux, are multiplied by a multiplier means 249 to produce output signal 81, representative of the calculated value of the internal reflux flow rate. This signal 81 is used by a flow controller 83, shown in FIG. 1, to manipulate the flow rate of the external reflux in such a manner so as to maintain the internal reflux flow rate at least substantially at a constant desired value. As is well known in control art, set point 82 may be automatically generated from analysis control devices or by other computing means to produce a multi-loop control system by which the internal reflux stabilizing system is manipulated as the inner (slave) control loop.

Figure 3:
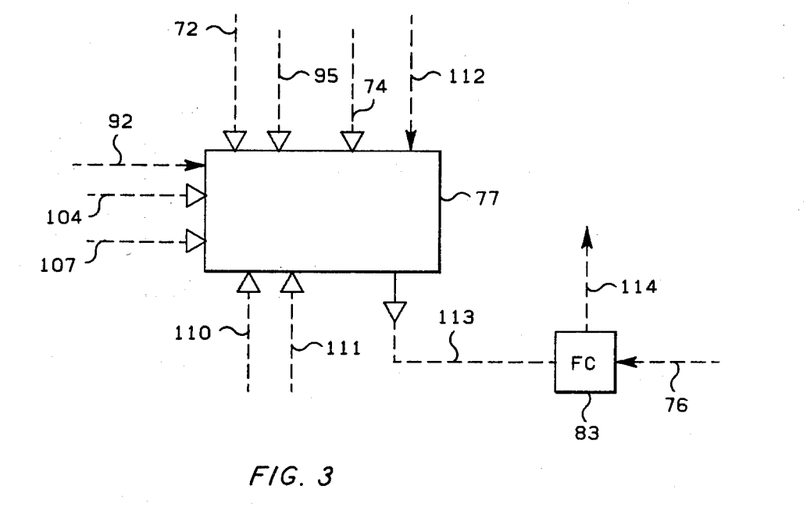
FIG. 3 is an alternate method of controlling the fractionation process illustrated in FIG. 1.

The second embodiment of the invention is shown in FIG. 3. Only the computer means 77 and the relevant input and output signals are shown. The fractionation process is identical to that described for FIG. 1. Only the method of control is different. Input signals 72, 74, 92, 95, 104, 107, 110, and 111 are the same as the similarly numbered input signals described in connection with FIG. 1. The difference between the second embodiment of the invention as illustrated in FIG. 3 and the first embodiment as illustrated in FIG. 1, is that a signal 112, representative of the desired flow rate of the internal reflux, is provided to the computer means 77 instead of signal 76, which was representative of the actual flow rate of the external reflux.

The computer means 77 calculates the specific heat of the external reflux, the heat of vaporization of the external reflux and the heat of vaporization of the internal reflux exactly as described in FIG. 1. The computer means then calculates the flow rate of the external reflux into the fractionation column required to maintain the desired flow rate of the internal reflux using equation (III). Equation (III) is known in the art as the implicit form of equation (II).

A signal 113, representative of the calculated value of the external reflux flow rate required to maintain a desired internal reflux flow rate, is output by the computer means 77 to a flow controller 83. Flow controller 83 is also provided with a signal 76, representative of the actual flow rate of the external reflux. Flow controller 83 compares the actual and required external reflux flow rates and generates a control signal 114 by which a pneumatic control valve 85 is manipulated as described in connection with FIG. 1.

Figure 4:
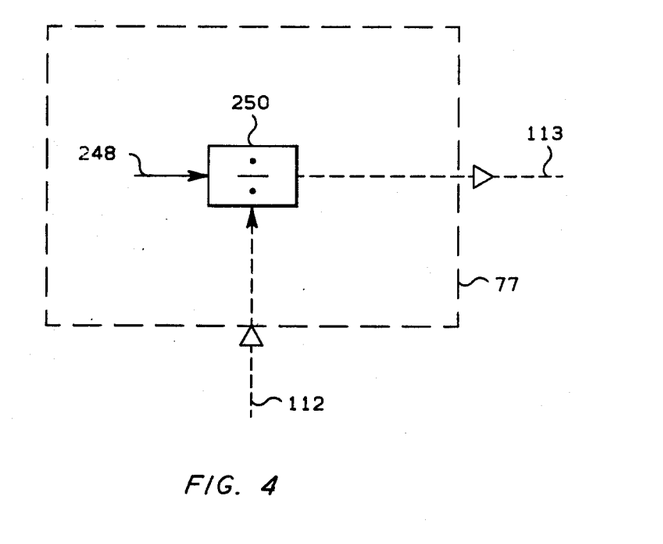
FIG. 4 is a representation of computer logic suitable for the calculation of the required external reflux flow rate in accordance with the alternative embodiment of the present invention as illustrated in FIG. 3.

A number of electronic and/or pneumatic systems can be used to automatically calculate the required external reflux flow rate using equation (III). The basic computer logic is shown in FIG. 4. Signal 248, representative of the value $$(H_R/H_{Ri}) (1 + K \Delta T)$$

is produced exactly as described in FIG. 2. Signal 112, representative of the desired flow rate of the internal reflux, is divided by signal 248 by dividing means 250 to produce signal 113, representative of the calculated value of the required external reflux flow rate. This signal 113 is utilized by flow controller 83, as described for FIG. 3, to manipulate the flow rate of the external reflux in such a manner so as to maintain the internal reflux flow rate at least substantially at a constant desired value.

The invention has been described in terms of a simple preferred embodiment as illustrated by FIG. 1. An alternative embodiment was described and illustrated by FIG. 3. In both embodiments the external reflux flow rate is varied to compensate for changes in $\Delta T$, thus maintaining the internal reflux flow rate at a substantially constant desired value. This has the effect of providing stable operation of a fractionation column.

Specific components which can be used in the practice of the preferred embodiment of the invention as shown in FIG. 1 and the alternative embodiment illustrated in FIG. 3 are as follows:

Controllers 13, 22, 32, 51, 61 and 83: Model 1412 RA51000 Taylor Instrument Co. Rochester, N. Y.

Control valves 15, 34, 53, 63, and 85: No. A240, Foxboro Co. Foxboro, Mass.

Control valve 24: Stabilflo Valve No. A218, Foxboro Co. Foxboro, Mass.

Flow transducers 17, 26, and 75: No. A94 Air Operated Differential pressure cell, Foxboro Co. Foxboro, Mass.

Flow sensors 19, 28, and 79: A78 orifice plate and flange union, Foxboro Co. Foxboro, Mass.

Analyzer transducers 91 and 94: Optichrome 102 Chromatograph, Applied Automation, Inc. Bartlesville, Okla.

Suitable sensors for temperatures 70 and 78, such as thermocouples or a differential resistance thermometer, for pressure 55, such as a bellows transducer, for the liquid levels, such as float or differential pressure type, and suitable transducers therefrom are each well known, commercially available control components such as described at length in *Chemical Engineers Handbook*, 3rd, 4th and 5th Edition, Chapters 19 and 22, respectively, McGraw-Hill, and in other publications.

Specific components which can be used to solve for the internal reflux flow rate as shown in FIG. 2 and the desired external reflux flow rate as illustrated in FIG. 4 are:

Subtracting means 241: No. B05885 Multi use Amp, Applied Automation, Inc. Bartlesville, Okla.

Multiplying means 243, 247, and 249: No. B05885 Multi use Amp, Applied Automation, Inc. Bartlesville, Okla.

Summing means 245: No. B05885 Multi use Amp, Applied Automation, Inc. Bartlesville, Okla.

Dividing means 250: No. B05885 Multi use Amp, Applied Automation, Inc. Bartlesville, Okla.

FIG. 3 of the cited article by Lupfer and Berger shows a simple pneumatic analog computer which could easily perform the calculation outlined by FIG. 2 simply by utilizing different constants to reflect the use by this invention of the derived value of the heat of vaporization of the external reflux divided by the heat of vaporization of the internal reflux. A digital computer could also be easily programmed to perform the required functions necessary to calculate the internal reflux flow rate or the required external reflux flow rate in accordance with the present invention.

Also, for reasons of brevity, conventional auxiliary fractionator equipment such as pumps for feed, reflux, and bottoms product, economizer heat exchangers, additional measurement-control devices et al have not been included in the above description as they play no part in the explanation of the invention.

While the invention has been described in terms of the presently preferred embodiment and an alternaive embodiment, reasonable variations and modifications are possible, by those skilled in the art, within the scope of the described invention and the appended claims. For example, economic consideraions may dictate that the value of the heats of vaporization of the external and internal reflux and the specific heat of the external reflux be based on engineering estimates rather than the measurements and calculations utilized by the present invention or that at least some simplification of the above rigorous computations be made. Also, this basic control method may be frequently used as a sub-system for more comprehensive column control.

That which is claimed is:

1. Apparatus comprising:
   a fractionation column means;
   conduit means for passing a feed mixture to be separated into said fractionation column means;
   conduit means for withdrawing a bottom product from a lower portion of said fractionation column means;
   conduit means for withdrawing a vapor stream from an upper portion of said fractionation column means;
   condensing means for partially condensing said vapor stream;
   accumulator means for phase-separating the thus partially condensed vapor stream;
   conduit means for withdrawing uncondensed vapor from said accumulator means as an accumulator overhead product;
   conduit means for withdrawing condensate from said accumulator means and for passing at least a portion thereof into an upper portion of said fractionation column means as external reflux therefor;
   means for establishing a first signal $T_0$ representative of the temperature of the said vapor stream at the top portion of said fractionation column means;
   means for establishing a second signal $T_R$ representative of the temperature of the said external reflux;
   means for establishing a third signal R representative of the flow rate of said external reflux;
   means for establishing a fourth signal K representative of the value of the specific heat of said external reflux divided by the heat of vaporization of said external reflux;
   means for establishing a fifth signal $H_R/H_{Ri}$ representative of the value of the heat of vaporization of the said external reflux divided by the heat of vaporization of the internal reflux, said internal reflux being the reflux liquid flowing inside said fractionation column means;
   means for establishing a sixth signal $R_{id}$ representative of the desired flow rate of said internal reflux; and
   means for establishing a seventh signal representative of the value +1;
   means for producing, in response to said first, second, third, fourth, fifth, sixth and seventh signals, an eighth signal and for utilizing said eighth signal to manipulate the flow rate of said external reflux.

2. Apparatus in accordance with claim 1 wherein each of said means for establishing said first signal $T_0$ and said means for establishing said second signal $T_R$ comprises a temperature sensing means and an associated transducer means.

3. Apparatus in accordance with claim 1 wherein said means for establishing said third signal R comprises a flow sensing means and an associated transducer means.

4. Apparatus in accordance with claim 1 wherein said means for establishing a fourth signal K comprises:
   means for establishing a plurality of ninth signals, each being representative of the concentration of a respective one of the various constituents of said external reflux;
   means for establishing a plurality of tenth signals, each being representative of the specific heat of a respective one of the various constituents of said external reflux;
   means for producing, in response to said plurality of ninth and tenth signals, an eleventh signal representative of the total specific heat of said external reflux;
   means for establishing a plurality of twelfth signals, each being representative of the heat of vaporization of a respective one of the various constituents of said external reflux;
   means for producing, in response to said plurality of ninth and twelfth signals, a thirteenth signal representative of the total heat of vaporization of said external reflux; and
   means for producing, in response to said eleventh and thirteenth signals, said fourth signal K.

5. Apparatus in accordance with claim 4 wherein said means for establishing a plurality of ninth signals comprises a chemical analysis means and an associated transducer means.

6. Apparatus in accordance with claim 4 wherein each of said means for producing said eleventh signal and said means for producing said thirteenth signal is a multiplying means and a summing means.

7. Apparatus in accordance with claim 4 wherein said means for producing said fourth signal, in response to said eleventh and thirteenth signals, is a dividing means.

8. Apparatus in accordance with claim 1 wherein said means for establishing a fifth signal $H_R/H_{Ri}$ comprises:
   means for establishing a plurality of ninth signals, each being representative of the concentration of a respective one of the various constituents of said external reflux;
   means for establishing a plurality of tenth signals, each being representative of the heat of vaporization of a respective one of the various constituents of said external reflux;
   means for producing, in response to said plurality of ninth and tenth signals, an eleventh signal representative of the total heat of vaporization of said external reflux;
   means for establishing a plurality of twelfth signals, each being representative of the concentration of a respective one of the various constituents of said internal reflux;
   means for establishing a plurality of thirteenth signals, each being representative of the heat of vaporization of a respective one of the various constituents of said internal reflux;

means for producing, in response to said plurality of twelfth and thirteenth signals, a fourteenth signal representative of the total heat of vaporization of said internal reflux; and means for producing, in response to said eleventh and fourteenth signals, said fifth signal $H_R/H_{Ri}$.

9. Apparatus in accordance with claim 8 wherein each of said means for establishing said plurality of ninth signals and said means for producing said plurality of twelfth signals comprises a chemical analysis means and an associated transducer means.

10. Apparatus in accordance with claim 8 wherein each of said means for establishing said eleventh signal and said means for producing said fourteenth signal is a multiplying means and a summing means.

11. Apparatus in accordance with claim 8 wherein said means for producing said fifth signal, in response to said eleventh and fourteenth signals, is a dividing means.

12. Apparatus in accordance with claim 1 wherein said means for establishing an eighth signal comprises a computer means and a flow controller means.

13. Apparatus in accordance with claim 12 wherein said computer means comprises:

means for subtracting said first signal $T_0$ from said second signal $T_R$ to produce a ninth signal $\Delta T$ representative of the difference between the temperature of said vapor leaving the top of said fractionation column means and the temperature of said external reflux entering said fractionation column means;

means for multiplying said ninth signal by said fourth signal to produce a tenth signal representative of $K \Delta T$;

means for adding said ninth signal and said seventh signal to produce an eleventh signal representative of $(1 + K \Delta T)$;

means for multiplying said eleventh signal by said fifth signal to produce a twelfth signal representative of $H_R/H_{Ri}(1 + K \Delta T)$;

and means for multiplying said twelfth signal by said third signal to produce a thirteenth signal representative of $R (H_R/H_{Ri}) (1 + K \Delta T)$ or representative of the calculated actual flow rate of said internal reflux as is shown by the equation $R_i = R (H_R/H_{Ri}) (1 + K \Delta T)$ where $R_i$ is representative of the actual flow rate of said internal reflux and all other symbols are as previously defined.

14. Apparatus in accordance with claim 12 wherein said computer means comprises:

means for subtracting said first signal $T_0$ from said second signal $T_R$ to produce a ninth signal $\Delta T$ representative of the difference between the temperature of said vapor leaving the top of said fractionation column means and the temperature of said external reflux entering said fractionation column means;

means for multiplying said ninth signal by said fourth signal to produce a tenth signal representative of $K \Delta T$;

means for adding said ninth signal to said seventh signal to produce an eleventh signal representative of $(1 + K \Delta T)$;

means for multiplying said eleventh signal by said fifth signal to produce a twelfth signal representative of $(H_R/H_{Ri}) (1 + K \Delta T)$;

and means for dividing said sixth signal by said twelfth signal to produce a thirteenth signal representative of $$\frac{R_{id}}{\frac{H_R}{H_{Ri}} (1 + K \Delta T)}$$

or representative of the calculated desired flow rate of said external reflux required to maintain some desired internal reflux flow rate as is shown by the equation $$R_c = \frac{R_{id}}{\frac{H_R}{H_{Ri}} (1 + K \Delta T)}$$

where $R_c$ is representative of the calculated desired flow rate of said external reflux and all other symbols are as previously defined.

15. A method of controlling a fractionation zone, said method comprising:

passing a feed mixture to be separated into a fractionation zone;

withdrawing a bottom product from a lower portion of said zone;

withdrawing a vapor stream from an upper portion of said fractionation zone;

partially condensing said fractionation vapor stream;

phase-separating the thus partially condensed vapor in an accumulation zone;

withdrawing uncondensed vapor from said accumulation zone as a vaporous overhead product;

withdrawing condensate from said accumulation zone and passing at least a portion thereof into an upper portion of said fractionation zone as external reflux therefor;

establishing a first signal $T_0$ representative of the temperature of said vapor leaving the top of said fractionation zone;

establishing second signal $T_R$ representative of the temperature of said external reflux entering said fractionation zone;

establishing a third signal R representative of the flow rate of said external reflux;

establishing a fourth signal K representative of the specific heat of said external reflux divided by the heat of vaporization of said external reflux;

establishing a fifth signal $H_R/H_{Ri}$ representative of the value of the heat of vaporization of said external reflux divided by the heat of vaporization of the internal reflux;

establishing a sixth signal representative of the desired flow rate of the internal reflux;

establishing a seventh signal representative of the quantity +1; and establishing an eighth signal in response to said first, second, third, fourth, fifth, sixth, and seventh signals and controlling the flow rate of said external reflux in response to said eighth signal.

16. A method in accordance with claim 15 wherein said steps of establishing said first signal $T_0$ and said second signal $T_R$ comprise:

utilizing a temperature sensing means to measure the temperature of said vapor leaving the top of said fractionation zone, utilizing a temperature sensing means to measure the temperature of said external reflux entering the fractionation zone; and utilizing transducer means to transmit the thus produced temperature measurements.

17. A method in accordance with claim 15 wherein said step of establihsing a third signal R comprises:

utilizing a flow sensor means to measure the actual flow rate of said external reflux; and utilizing a transducer means to transmit said flow rate measurement.

18. A method in accordance with claim 15 wherein said step of establishing a fourth signal K comprises:

establishing a plurality of ninth signals, each being representative of the concentration of a respective one of the various constituents of said external reflux;

establishing a plurality of tenth signals, each being representative of the specific heat of a respective one of the various constituents of said external reflux;

multiplying said plurality of ninth signals and said plurality of tenth signals and summing the products of said multiplication to produce an eleventh signal representative of the total specific heat of said external reflux;

establishing a plurality of twelfth signals, each being representative of the heat of vaporization of a respective one of the various constituents of said external reflux;

multiplying said plurality of ninth signals by said plurality of twelfth signals and summing the products of said multiplication to produce a thirteenth signal representative of the total heat of vaporization of said external reflux; and dividing said eleventh signal by said thirteenth signal to produce said fourth signal K.

19. A method in accordance with claim 18 wherein said step of establishing a plurality of ninth signals comprises:

utilizing a chemical analysis means to sample said external reflux and measure the concentration of each constituent of said external reflux; and utilizing a transducer means to transmit the measured concentration of each constituent of said external reflux.

20. A method on accordance with claim 15 wherin said step of establishing a fifth signal $H_R/H_{Ri}$ comprises:

establishing a plurality of ninth signals, each being representative of the concentration of a respective one of the various constituents of said external reflux;

establishing a plurality of tenth signals, each being representative of the heat of vaporization of a respective one of the various constituents of said external reflux;

multiplying said plurality of ninth signals and said plurality of tenth signals and summing the products of said multiplication to produce an eleventh signal representative of the total heat of vaporization of said external reflux;

establishing a plurality of twelfth signals, each being representative of the concentration of a respective one of the various constituents of said internal reflux;

establishing a plurality of thirteenth signals, each being representative of the heat of vaporization of a respective one of the various constituents of said internal reflux;

multiplying said plurality of twelfth signals by said plurality of thirteenth signals and summing the products of said multiplication to produce a fourteenth signal representative of the total heat of vaporization of said internal reflux; and dividing said eleventh signal by said fourteenth signal to produce said fifth signal $H_R/H_{Ri}$.

21. A method in accordance with claim 20 wherein said step of establishing a plurality of ninth and twelfth signals comprises:

utilizing a chemical analysis means to sample said external reflux or said internal reflux and measure the concentration of each constituent of said external reflux or said internal reflux; and utilizing a transducer means to transmit the measured concentration of each constituent of said external reflux or said internal reflux.

22. A method in accordance with claim 15 wherein said step of establishing a sixth signal $R_{id}$ comprises:

utilizing an engineering analysis of said fractionation process to derive said desired flow rate of said internal reflux; and utilizing a signal generating means to transmit said desired flow rate information.

23. A method in accordance with claim 15 wherein said step of establishing an eighth signal comprises:

subtracting said first signal $T_0$ from said second signal $T_R$ to produce a ninth signal $\Delta T$ representative of the difference between the temperature of said vapor leaving the top of said fractionation zone and the temperature of said external reflux entering said fractionation zone;

multiplying said ninth signal by said fourth signal to produce a tenth signal representative of $K \Delta T$;

adding said tenth signal and said seventh signal to produce an eleventh signal representative of $$(1 + K \Delta T);$$

multiplying said eleventh signal by said fifth signal to produce a twelfth signal representative of $$(H_R/H_{Ri})(1 + K \Delta T);$$

multiplying said twelfth signal by said third signal to produce a thirteenth signal representative of $$R(H_R/H_{Ri})(1 + K \Delta T)$$

or representative of the calculated actual flow rate of said internal reflux as is shown by the equation $$R_1 = R (H_R/H_{Ri}) (1 + K \Delta T)$$

where $R_i$ is representative of the actual flow rate of said internal reflux and all other symbols are as previously defined, and comparing said sixth signal and said thirteenth signal to establish said eighth signal representative of the required change in the flow rate of said external reflux necessary to maintain a desired flow rate of said internal reflux.

24. A method in accordance with claim 15 wherein said step of establishing an eighth signal comprises:

subtracting said first signal $T_0$ from said second signal $T_R$ to produce a ninth signal $\Delta T$ representative of the difference between the temperature of said vapor leaving the top of said fractionation zone and the temperature of said external reflux reentering said fractionation column zone;

multiplying said ninth signal by said fourth signal to produce a tenth signal representative of $K \Delta T$;

adding said tenth signal and said seventh signal to produce an eleventh signal representative of $$(1 + K \Delta T);$$

multiplying said eleventh signal by said fifth signal to produce a twelfth signal representative of $(H_R/H_{Ri}) (1 + K \Delta T)$;

dividing said sixth signal by said twelfth signal to produce a thirteenth signal representative of $$\frac{R_{id}}{\frac{H_R}{H_{Ri}} (1 + K \Delta T)}$$

or representative of the calculated desired flow rate of said external reflux required to maintain some desired internal reflux flow rate as is shown by the equation where $R_c$ is representative of the calculated desired flow rate of said external reflux and all other symbols are as previously defined; and comparing said third signal and said thirteenth signal to establish said eighth signal representative of the required change in the flow rate of said external reflux necessary to maintain a desired flow rate of said internal reflux.

* * * * *

UNITED STATES PATENT AND TRADEMARK OFFICE
CERTIFICATE OF CORRECTION

PATENT NO. : 4,096,574
DATED : June 20, 1978
INVENTOR(S) : David A. Christie

It is certified that error appears in the above-identified patent and that said Letters Patent are hereby corrected as shown below:

Column 13, line 23, delete "establihsing" and insert --- establishing ---. Column 15, line 19, after "fractionation" and before "zone", delete "column". Column 16, line 17, add:

$$R_c = \frac{R_{id}}{\frac{H_R}{H_{Ri}} (1 + K \triangle T)}$$

Signed and Sealed this

Nineteenth Day of June 1979

[SEAL]

Attest:

RUTH C. MASON
Attesting Officer

DONALD W. BANNER
Commissioner of Patents and Trademarks